United States Patent

[11] 3,581,213

| [72] | Inventor | Elmo E. Crump<br>63 Grover Lane, West Caldwell, N.J. 07006 |
|---|---|---|
| [21] | Appl. No. | 727,857 |
| [22] | Filed | May 9, 1968 |
| [45] | Patented | May 25, 1971 |

[54] SYNCHRONIZED BURST GENERATOR
4 Claims, 3 Drawing Figs.

[52] U.S. Cl. .................................................. 328/25,
307/220, 307/239, 328/30, 328/136
[51] Int. Cl. .................................................. H03b 19/00
[50] Field of Search .......................................... 328/22, 25,
39, 40, 136, 48, 30; 307/225, 295, 220, 239, 271;
331/173, 178

[56] References Cited
UNITED STATES PATENTS

| 2,724,776 | 11/1955 | Sherwin | 331/173X |
| 2,883,528 | 4/1959 | Maxwell | 328/22X |
| 3,146,432 | 8/1964 | Johnson | 307/295X |
| 3,239,763 | 3/1966 | Cistola | 328/30X |
| 3,297,952 | 1/1967 | Thylander | 328/136X |

*Primary Examiner*—Stanley T. Krawczewicz
*Attorney*—March, Gillette and Wyatt

ABSTRACT: A burst generator including a continuous wave oscillator, means to synchronize a pulse generator to the oscillator so that each pulse starts at a corresponding point on a cycle of the continuous wave, and a gating circuit actuated by the pulses to transmit repetitive bursts of oscillations, each starting at a corresponding point of a cycle.

INVENTOR.
ELMO E. CRUMP
BY
March, Gillette & Hyatt
ATTORNEYS

SYNCHRONIZED BURST GENERATOR

This invention relates to means for generating repetitive bursts of oscillations by gating a continuous wave in such a timed relationship that the first oscillation of each burst begins at the same relative point on a cycle of the continuous wave as the first oscillation of all of the other bursts.

Pulsed oscillations are useful in certain electronic system, particularly in testing apparatus. The bursts of oscillations may be applied to circuits under test to determine the transient response of such circuits and to determine the frequency response by changing the frequency oscillations making up the bursts. However, the bursts are not coherent since the first oscillation starts at a different point in the cycle, and therefore only the envelope of the burst can be used in making measurements; individual cycles cannot be displayed by a cathode ray oscilloscope unless they have a sufficiently low frequency and can be viewed by using a single sweep time base.

It is one of the main objects of the present invention to produce coherent bursts by gating continuous oscillations at a repetition rate that is an integral submultiple of the frequency of the oscillations or is determined by counting a predetermined integral number of oscillations. Each burst then begins at the same relative phase or point on one of the oscillations.

In accordance with this invention, the oscillations to be observed are generated in a continuous wave oscillator, the output signal of which is divided, or counted down, to some convenient, integral submultiple. The submultiple frequency signal is then used to trigger or generate a gating pulse signal, and since the gating pulse signal is controlled by the submultiple signal, each gating pulse is synchronized to start at the same part of a cycle of the continuous wave signal. The gating pulse may have a leading edge coincident with the start of the continuous wave oscillations or the 180° point or any other point, but each gating pulse will start at the same point relative to the beginning of a cycle. By locking the repetitive sweep generator of an oscilloscope to the pulse signal, a coherent image of the bursts may be presented on the oscilloscope.

The invention will be described in greater detail hereinafter in conjunction with the drawing in which.

Figure 1:
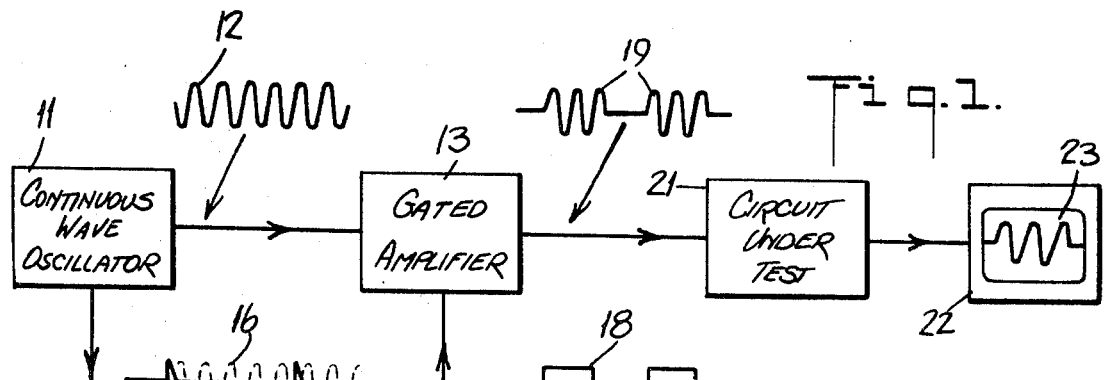
FIG. 1 is a block diagram of a burst generator constructed according to the invention.

The burst generator in the drawing derives its basic signal from an oscillator 11 which generates a continuous wave signal 12. This signal is applied to a gated amplifier 13 and to a frequency divider 14. The latter may be adjusted to divide the signal 12 by an integral submultiple of its frequency to produce a synchronized pulse signal 16 shown superimposed on a replica of the signal 12. As may be seen, the synchronized pulses 16 occur at corresponding points of different oscillations of the signal 12.

The pulses 16 also act as a synchronizing signal and are applied to a pulse generator 17 to trigger the leading edge of each of a series of pulses 18. The pulse generator 17, in turn, is connected to the gated amplifier 13 to control, or gate, bursts 19 of oscillations of the continuous wave signal 12. These bursts are also depicted against a replica of the continuous wave signal 12 to show how each burst starts at the same phase point.

The bursts are applied to a circuit 21 under test and the output signal is applied to the signal input terminals of a cathode ray oscilloscope 22. The synchronizing signal 16 is applied to the synchronizing signal input terminals of the oscilloscope 22, and the resultant coherent burst image is traced out on the cathode-ray tube 23. If the frequency of signal 12 is very high, a sampling oscilloscope may be required to display the burst pattern, but this presents no problem since the bursts are all coherent.

Figure 2:
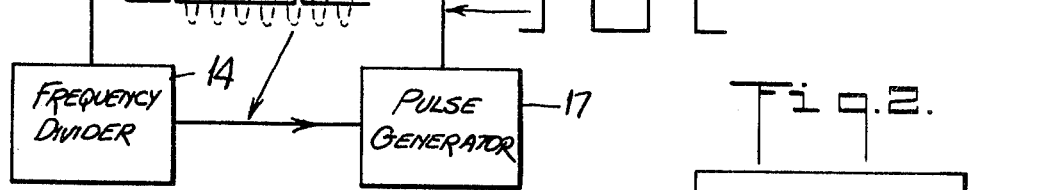
FIG. 2 shows an oscilloscope pattern for noncoherent bursts.

FIG. 2 shows the pattern that would appear on the tube 23 if the first oscillation in each burst started with a different phase. The most that could be seen would be the envelope of the bursts but not each individual cycle.

Figure 3:
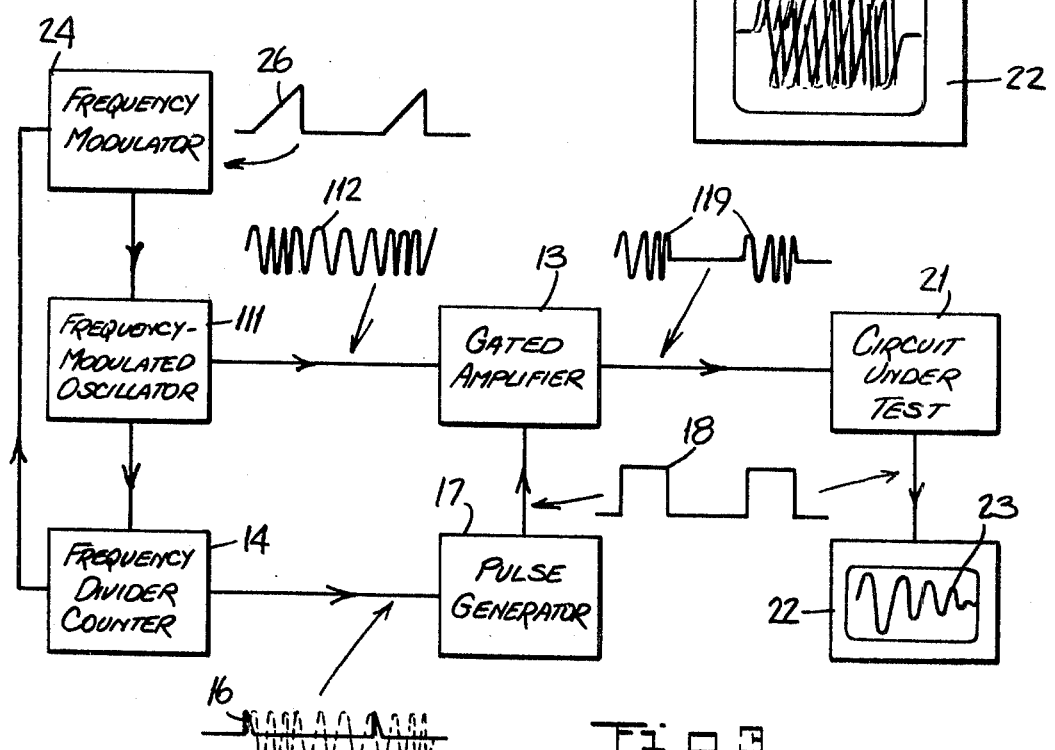
FIG. 3 shows a modification of the circuit in FIG. 1 to produce bursts having continuously variable frequency.

The invention lends itself to producing coherent wobbulated bursts, that is, bursts made up of oscillations that start at one frequency, usually low, and change with time through a whole band or range of frequencies. In FIG. 3 the oscillator 111 does not have a fixed frequency but is capable of being frequency-modulated. Nevertheless, the output signal 112 can be divided, or counted, to produce a pulse signal 16 which occurs every $n$th cycle of the signal 112. The pulse signal 16 from the divider 14 is applied to a modulating signal generator 24 which produces a sawtooth signal 26, in this embodiment, to modulate the oscillator 111 to cause the frequency of the oscillations 112 to change linearly with time. As a result, each of the bursts 119 that passes through the gated amplifier 13 consists of a series of oscillations that start off at a relatively low frequency and progress to a relatively high frequency, but, just as in the embodiment in FIG. 1, the first oscillation starts off with the same phase in each burst.

One advantage of the variation in frequency during each burst is that it permits a measurement of the frequency response of the circuit 21 to be made. As indicated by the coherent burst pattern on the tube 23, the circuit 21 has a frequency response that has a peak in the lower part of the band. The extent of the frequency band displayed is determined by the frequency deviation produced by the modulating signal 26, but it is also determined by the width, or duration, of the pulses 18. These may be made narrower, or, more precisely, of lesser duration than the sawtooth signals 26, with the result that the image on the tube 23 can be expanded in the X direction. Of course, the oscilloscope may have internal circuits for expanding any part of the pattern.

While this invention has been described in terms of specific embodiments, it will be understood by those skilled in the art that modifications may be made therein without departing from the true scope of the invention as defined by the following claims.

What I claim is:

1. A synchronously pulsed burst generator comprising: a continuous wave oscillation generator; a counter circuit connected thereto to count a predetermined integral number of said oscillations; pulse generating means responsive to the output of said counter circuit to generate a pulse each time said predetermined integral number of oscillations has been counted; a gated circuit connected to said pulse generating means to be controlled thereby; and a connection from said continuous wave oscillation generator to said gated circuit, said gated circuit being actuated to transmit a burst of said oscillations at the occurrence of each of said pulses, the initial oscillation of each of said bursts beginning at the same phase.

2. The invention as defined in claim 1 in which said counter circuit is a frequency divider and said continuous wave oscillation generator is a fixed frequency oscillator.

3. The invention as defined in claim 1 in which said pulse generator means comprises means for generating a synchronizing impulse wave and means connected thereto and controlled thereby for generating a rectangular pulse wave with each rectangular pulse having a leading edge synchronized by one of said synchronizing impulses.

4. The invention as defined in claim 1 comprising, in addition: a modulating signal generator connected to said counter circuit to be controlled thereby to generate a repetitive modulating signal; and a connection from said modulating signal generator to said oscillator to control the frequency of oscillations generated therein in accordance with the modulating signal.